Patented Aug. 4, 1942

2,292,205

UNITED STATES PATENT OFFICE 2,292,205

ALUMINUM PHENATE

George H. Denison, Jr., Berkeley, and Arthur C. Ettling, Richmond, Calif., assignors to Standard Oil Company of California, San Francisco, Calif., a corporation of Delaware No Drawing. Application October 4, 1938, Serial No. 233,330

5 Claims. (Cl. 260—448)

The object of this invention is aluminum phenates of high molecular weight alkyl phenols.

It is believed that the aluminum salts of alkyl phenols in which the phenolic radical contains more than ten carbon atoms have not been prepared heretofore. These compounds comprise new and useful compositions of matter. The preferred compositions comprise those in which the aluminum salt contains an alkyl phenol having an alkyl radical with at least five carbon atoms.

We have discovered that aluminum compounds of the above types may be prepared by reacting aluminum metal with the high molecular weight alkyl phenol. Despite the fact that the high molecular weight alkyl phenols are in general relatively unreactive, their aluminum salts have been obtained in a relatively pure condition by the process of this invention.

Accordingly, an object of the invention is to provide a process for preparing aluminum phenates of high molecular weight alkyl phenols.

Another object of the invention comprises the production of a new composition of matter consisting of an aluminum phenate containing an alkyl phenolic radical having more than ten carbon atoms, and preferably containing an alkyl phenol in which an alkyl radical comprises at least five carbon atoms.

A further object of the invention is the provision of a new composition of matter comprising a basic aluminum phenate such as an aluminum diphenate of an alkyl phenol.

An additional object of the invention comprises the production of an aluminum di(alkyl phenol) in which the alkyl radical contains at least five, and preferably more than ten, carbon atoms.

Further objects of the invention comprise the production of aluminum phenates of lauryl phenol or cetyl phenol.

The new compounds herein disclosed are useful as ingredients in compositions such as hydrocarbon fuels, lubricating oils, drying oils, varnishes and the like. These compounds also comprise useful base materials for synthetic organic processes for the production of compounds where it is desirable to introduce a substituent containing an alkaryl group of the present phenolic type.

According to the invention, aluminum phenates are prepared by reaction between the high molecular weight alkyl phenol and metallic aluminum. Elevated temperatures, preferably from approximately 340° F. to 550° F., are utilized. The reaction will take place without the addition of a catalyst but the addition of a small crystal of iodine or the presence of mercury, as for instance in an aluminum amalgam, is desirable. In the preferred embodiment of the process an alkyl phenol, such as lauryl or cetyl phenol, is reacted with the aluminum in proportions such that a basic aluminum phenate is obtained. However, the invention in its broader aspects contemplates the use of proportions of the phenols and reaction conditions which will yield the normal salt, i. e. a composition containing approximately three equivalents of the phenol for each atom of aluminum.

Specific examples of methods of preparing an alkyl phenol suitable for use in the process of this invention comprise the following:

*Example 1.*—Phenol and a butene polymer having an apparent molecular weight of 194 and obtained by polymerization of a mixture of butenes containing butene-1, butene-2, and iso-butene were mixed. To this mixture, containing 237 grams of phenol and 500 grams of the above mentioned butene polymers, 140 cubic centimeters of 94% sulfuric acid were added slowly with agitation. The temperature was kept below 65° F. during addition of the acid. The mixture was agitated for two hours after the addition of acid was completed and permitted to come to room temperature. The reaction product was then diluted with an equal volume of water and placed in a sealed autoclave where it was heated at 350° F. for an hour with agitation. The product was washed with water, 5% sodium carbonate solution and again with water in order to free it of sulfuric acid sulfonates and unreacted phenol. A 93% yield of high molecular weight water-insoluble alkyl phenol having an acetyl number of 181 was obtained.

*Example 2.*—511 grams of crude cresylic acid, 900 grams of olefine polymers containing an average of 14 carbon atoms per molecule, and 475 grams of 98% sulfuric acid were utilized in preparing an alkylated cresol. These ingredients were combined and treated in the manner described above for preparation of cetyl phenol. The product was vacuum-distilled at 10 mm. and a 50 to 90% cut of an alkyl phenol obtained which had a molecular weight of 291.

The above method of preparing the alkyl phenols is merely illustrative. Other condensation reactions utilizing alcohols or alkyl chlorides rather than olefines as a starting material may be adopted for introducing an alkyl group into the aromatic nucleus. Also other known condensation agents, such as aluminum chloride, zinc chloride and the like, may be utilized to effect the alkylation of the phenol. A mixture of sulfuric and glacial acetic acids may be used with advantage as a condensing agent. A suitable mixture comprises 100 parts by weight 98% $H_2SO_4$ to 60 parts by weight of glacial acetic acid. The presence of the acetic acid facilitates temperature control and gives a softer, easier handled reaction product.

As has been previously indicated, the aluminum phenates of this invention are prepared by directly reacting the phenol with aluminum. For purposes of illustration, the following specific examples are given:

*Example 3.*—A mixture of 4 grams of aluminum metal, 45 grams of an alkylated phenol averaging approximately cetyl phenol and a crystal of iodine were heated at a temperature above approximately 340° F. for about four hours or until gas evolution had apparently ceased. The alkylated phenol is preferably one prepared from butene polymers, as above described. The gas formed comprised hydrogen and was removed as the reaction progressed. The product remaining in the reaction zone was dissolved in petroleum ether and filtered. The filtrate, after removal of petroleum ether, showed an ash of 7.56%. This corresponds to about 99% yield calculated on the basis of aluminum di(cetyl phenate), i. e. $Al(C_{16}H_{33}C_6H_4O)_2OH$.

*Example 4.*—100 grams of an alkyl phenol (molecular weight 290) and 15 grams of aluminum wire were heated together as in Example 3. A crystal of iodine was added as a catalyst. Reaction continued until no further hydrogen evolution was evident. The product was dissolved in petroleum ether, filtered, and the petroleum ether evaporated on a steam bath. It was found that 3.2 grams of aluminum had reacted to form an aluminum phenate. The large excess of aluminum was used to accelerate the reaction time.

The aluminum alkyl phenates herein disclosed are characterized by high oil solubility and freedom from entrained or dissolved water. These compounds are an amorphous solid at normal atmospheric temperature, soften at approximately 200° F., and are fairly fluid at 400° F. The aluminum alkyl phenates are light in color and soluble in the usual organic solvents.

The process of this invention has a number of advantages. It avoids the presence of water in the reaction zone and thereby precludes difficulties often encountered by reason of hydrolysis of the reaction product, which in turn decreases yield and introduces impurities. The process permits the production of high yields of aluminum phenates even though the alkyl phenols are relatively unreactive. It will be noted that hydrogen comprises the principal reaction product, in addition to the aluminum phenate, and that this gas is easily removed without undue contamination or modification of the finished product. This last feature is of particular utility in that the necessity for removing substantial amounts of reaction products comprising inorganic solids, water or components resulting from side reactions with water is avoided. Other advantages of the process will be apparent to those skilled in the art.

While the character of this invention has been described in detail and numerous examples of the preparation and application of the composition given, this has been done by way of illustration only and with the intention that no limitation should be imposed on the invention thereby. It will be apparent to those skilled in the art that numerous modifications and variations of the illustrative examples may be effected in the practice of the invention which is of the scope of the claims appended hereto.

We claim:

1. An aluminum phenate of an alkyl monohydroxy phenol, said alkyl monohydroxy phenol containing an alkyl group having more than four carbon atoms.

2. An aluminum di-phenate.

3. A compound of the type formula:

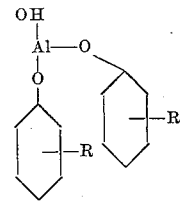

in which R is an alkyl group containing at least five carbon atoms.

4. A compound of the formula:

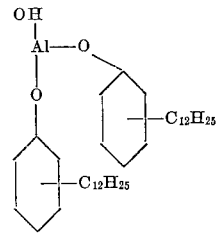

5. A compound of the formula:

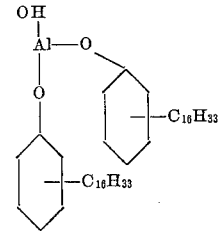

GEORGE H. DENISON, Jr.
ARTHUR C. ETTLING.